United States Patent [19]
von Musil et al.

[11] Patent Number: 5,574,325
[45] Date of Patent: Nov. 12, 1996

[54] IMPREGNATABLE CONFIGURATION OF A CARRIER BODY AND WINDING ELEMENTS

[75] Inventors: Rudolf von Musil, Oberhausen; Wolfgang Schier, Mülheim; Günter Kremser, Mülheim; Norbert Didzun, Mülheim; Rainer Müller, Ratingen; Ferdinand Stobbe, Mülheim, all of Germany

[73] Assignee: Siemens Aktiengesellschaft, Munich, Germany

[21] Appl. No.: 213,228

[22] Filed: Mar. 14, 1994

Related U.S. Application Data

[63] Continuation of PCT/EP92/01874 Aug. 17, 1992.

[30] Foreign Application Priority Data

Sep. 13, 1991 [EP] European Pat. Off. ............... 9111568

[51] Int. Cl.$^6$ ................................................. H02K 3/34
[52] U.S. Cl. .......................................................... 310/215
[58] Field of Search ............................ 310/215, 45, 196, 310/179, 68 R; 174/117 R

[56] References Cited

U.S. PATENT DOCUMENTS

| | | | |
|---|---|---|---|
| 3,990,029 | 11/1976 | Kano et al. | 335/297 |
| 4,001,616 | 1/1977 | Lonseth et al. | 310/45 |
| 4,091,139 | 5/1978 | Quirk | 174/120 SC |
| 4,356,417 | 10/1982 | Smith et al. | 310/45 |
| 5,030,870 | 7/1991 | Wichmann | 310/215 |
| 5,066,881 | 11/1991 | Elton et al. | 310/45 |

FOREIGN PATENT DOCUMENTS

| | | |
|---|---|---|
| 0379012 | 7/1990 | European Pat. Off. . |
| 3636008 | 6/1987 | Germany . |
| 402144 | 11/1965 | Switzerland . |
| 91/01059 | 1/1991 | WIPO . |

OTHER PUBLICATIONS

"Herstellung der Wicklungen elektrischer Maschinen", H. Sequenz, Springer Verlag, Vienna and New York, 1973.

"Glimmer und Glimmererzeugnisse", Hans–Werner Rotter, Siemens AG, Berlin and Munich, 1985, pp. 9–136.

Japanese Patent Abstract No. 55–114158 (Kadotani), dated Sep. 3, 1980.

Japanese Patent Abstract No. 57–196844 (Souma), dated May 27, 1981.

Japanese Patent Abstract No. 59–117435 (Minami), dated Jul. 6, 1984.

*Primary Examiner*—Mark O. Budd
*Attorney, Agent, or Firm*—Herbert L. Lerner; Laurence A. Greenberg

[57] ABSTRACT

A configuration, which may be part of a heavy-duty dynamoelectric machine, in particular a stator, being impregnated with a filler such as a cured epoxy resin, includes a ferromagnetic and electrically conductive carrier body having grooves formed therein defining groove walls, and winding elements disposed in the grooves. Each of the winding elements has an electrically highly conductive basic unit, an impregnatable insulating sleeve surrounding the basic unit, and an electrically weakly conductive, impregnatable protective layer enveloping the insulating sleeve. Impregnatable separating layers are each disposed between a respective one of the winding elements and at least one of the groove walls of a respective one of the grooves. The separating layers are substantially formed of laminated mica sheets resting flat between the winding element and the groove wall. A multiplicity of electrically weakly conductive bridges electrically connects the protective layer through the separating layer to the groove wall. The winding elements may be winding rods.

19 Claims, 4 Drawing Sheets

IMPREGNATABLE CONFIGURATION OF A CARRIER BODY AND WINDING ELEMENTS

CROSS-REFERENCE TO RELATED APPLICATION

This application is a Continuation of International Application Ser. No. PCT/EP92/01874, filed Aug. 17, 1992.

BACKGROUND OF THE INVENTION

Field of the Invention

The invention relates to a configuration of a ferromagnetic, electrically conductive bearer or carrier body and winding elements, for instance being part of a heavy-duty electric machine with an electrical power consumption or output of more than approximately 20 MVA and preferably more than approximately 50 MVA. In particular, the invention relates to such a configuration for use as a stator in a turbogenerator.

A winding element in such a configuration typically has a basic unit with at least one electrically highly conductive metal wire or metal rod, and in particular a number of such metal rods, and is surrounded by an insulating sleeve being enveloped by an electrically semiconductive protective layer. The insulating sleeve of a winding element typically is formed of a material that contains mica and that is intended to be, or is, impregnated with a filler. Typically, it is a fine-mica-based tape which is wound up onto the basic unit, and the filler is a synthetic resin, preferably a hot-curing epoxy resin system, such as a hot-curing mixture of an epoxy resin and an acid anhydride. A metal wire or metal rod located in a winding element can be hollow, in order to carry a flowable coolant. Winding elements in the form of winding rods with rod-shaped basic units, and in particular with approximately straight basic units having bent ends, as well as in the form of shaped coils with basic units in the form of wound-on wires, are known. As a rule, shaped coils have two approximately straight segments, each to be placed in separate grooves. Winding rods are typically used in very heavy-duty dynamoelectric machines, for instance in turbogenerators, while shaped coils are preferably used in low-capacity dynamoelectric machines.

The most widely used method to produce a component with winding elements for a heavy-duty dynamoelectric machine requires the preparation of winding elements that are already provided with the impregnation of their insulating sleeves and that have received the requisite external shape by curing of the impregnation in special press molds, before their insertion into the component. So-called whole-part impregnation processes have also meanwhile come into use. In those processes, the winding elements receive their filler impregnations only after installation in the corresponding carrier body. The introduction of the whole-part impregnation process rendered the previously required precise shaping by pressing or the like largely superfluous. In the whole-part impregnation process, the grooves containing the winding segments in a carrier body are also substantially completely filled with the filler, so that the winding elements are maximally immovably fixed in the grooves of the carrier body, without additional wedging provisions of the kind that had always been required previously.

When a configuration that is to be impregnated and includes a carrier body and winding elements is constructed, the fact that the configuration is exposed to changing temperatures in a range from typical ambient temperatures to more than 100° C., not only in the impregnation with filler and the ensuing curing of the filler, but in later operation in an electrical machine as well, must be taken into account. Due to the differing thermal expansion coefficients of the carrier body (which is typically a ferromagnetic metal) and the filler (which as a rule is epoxy resin), the possibility that thermal strains and fissuring may occur in the filler must be weighed and taken into account. It is already known to insert a separating layer between each winding element and at least one wall of the groove into which it is placed, with the strength of the separating layer being markedly reduced as compared with the strength of other layers in the groove, so that the fissuring occurs preferentially in the separating layer. In order to avoid corona discharges in such fissures (a danger that exists especially in the stators of heavy-duty electrical machines), the separating layer is electrically shielded by being inserted between two layers that are joined together and are at least weakly electrically conductive.

The electrically weakly conductive layer that is immediately adjacent the winding element can then be the protective layer that is typically already associated with the winding element to provide "external corona protection". The functions of the other electrically at least weakly conductive layer, which is opposite the protective layer behind the separating layer, can be assumed by the groove wall itself under some circumstances. However, an additional electrically conductive or weakly conductive intermediate layer may also be inserted.

Other embodiments of employing the whole-part impregnation process in the production of components for heavy-duty dynamoelectric machines can be found in Published International Application WO 91/01059, corresponding to U.S. Pat. No. 5,030,870, and in Published European Application No. 0 379 012A2. Those references both pertain to the production of configurations of ferromagnetic and electrically conductive carrier bodies and winding rods that are intended to be subjected to the whole-part impregnation process as described above. The second of those references moreover provides indications of a way in which the retention of the winding rods in a carrier body may be constructed, while exploiting the advantages that result from the whole-part impregnation process.

Other information on the whole-part impregnation process in the production of components for dynamoelectric machines may be found in both German Published, Non-Prosecuted Application DE 36 36 008A1 and U.S. Pat. No. 3,990,029. However, both of those references relate to configurations with winding bars having insulating sleeves which are already finally impregnated by the time they are installed in the carrier body.

Information on producing the winding elements and windings of electric machines and information on insulations in machines subject to heavy electrical and thermal loads may be found in the book entitled "Herstellung der Wicklungen elektrischer Maschinen" [Production of Windings for Electrical Machines], edited by H. Sequenz, Springer-Verlag, Vienna and New York 1973. A detailed discussion of mica, the material that is highly important for insulations in electrical machines, is found in the book entitled "Glimmer and Glimmererzeugnisse" [Mica and Mica Products], by H.-W. Rotter, published by Siemens AG, Berlin and Munich 1985. Particularly that latter work contains information on the use of laminated mica, which is understood to mean sheets produced by splitting large mica crystals, and fine mica, which is understood to be a paper-like product of finely ground mica. Laminated mica and fine mica are preferably used in the form of mica tapes, which are made from the respective mica product on a substrate such as Japan paper, glass cloth, or synthetic-fiber cloth. According to the second reference above, fine mica is the preferred product for making insulation elements in machines which are subject to heavy thermal and electrical loads, since a laminated mica insulation has a substantially greater tendency than fine mica to form voids and could thus possibly cause corona discharges in insulations, because of the resilience and the tendency toward further splitting that the sheets of laminated mica have.

A configuration of a ferromagnetic and electrically conductive carrier body and winding rods to be impregnated with a filler by the whole-part impregnation process, and in which a separating layer that is electrically shielded to prevent corona discharges is disposed between each winding rod and at least one wall of the associated groove as already explained, is shown in Published International Application WO 91/01059, corresponding to U.S. Pat. No. 5,030,870. The separating layer is formed with the aid of substances that cannot be wetted by the filler. Such substances may be coatings or impregnations of textiles or foils, which may optionally be permeable to the filler by means of perforations or the like. In order to assure the shielding of the separating layer, that layer is located between two electrically weakly conductive layers. Those latter layers may either touch one another through the separating layer and thus form electrical contacts, or a metal contact conductor may be used that is in contact with both weakly conductive layers.

SUMMARY OF THE INVENTION

It is accordingly an object of the invention to provide an impregnatable configuration of a ferromagnetic and electrically conductive carrier body and winding elements which are placed in associated grooves of the carrier body, which overcomes the hereinafore-mentioned disadvantages of the heretofore-known devices of this general type, which is to be impregnated with a filler according to the whole-part impregnation process (in which the insulating sleeves of the winding elements also obtain their impregnation), in which a separating layer that is permeable to the filler is provided between each winding element and at least one wall of the carrier body at each associated groove, in which the protective layer of each winding element and the groove wall are electrically connected with one another through the separating layer, in which parting means that make the impregnation more difficult need not be used, and in which separate metal contact conductors which can cause local heating because of the eddy current losses that might occur in them, are not needed.

With the foregoing and other objects in view there is provided, in accordance with the invention, a configuration, comprising a ferromagnetic and electrically conductive carrier body having grooves formed therein defining groove walls; winding elements or rods disposed in the grooves, each of the winding elements having an electrically highly conductive basic unit, an impregnatable insulating sleeve surrounding the basic unit, and an electrically weakly conductive, impregnatable protective layer enveloping the insulating sleeve; impregnatable separating layers each being disposed between a respective one of the winding elements and at least one of the groove walls of a respective one of the grooves, the separating layers being substantially formed of laminated mica sheets resting flat between the winding rod and the groove wall; and a multiplicity of electrically weakly conductive bridges electrically connecting the protective layer through the separating layer to the groove wall.

In particular, the invention enables advantageous exploitation of the splittability of the laminated mica. Due to their crystalline structure, mica crystals, and therefore the laminated mica sheets obtained from mica crystals, tend to break down further in a separate splitting plane. Laminated mica sheets split up into a plurality of sheets, each of correspondingly reduced thickness, that rest on one another. This property is exploited to create zones, in which the fissuring dictated by shrinkage processes is concentrated, in each groove of the configuration of the invention. The impregnatability of the configuration is not impaired by the use of laminated mica. In the whole-part impregnation, the filler can flow through the laminated mica sheets or can cross gaps between laminated mica sheets that rest on one another like fish scales.

The invention moreover maximally avoids eddy currents that could be produced by magnet fields in the groove which would vary over time, because a poor conductor is employed to form the electrical contacts through the separating layer, instead of an electrically highly conductive contact conductor. Therefore the configuration of the invention is especially suitable for producing a stator for an electrically heavily strained generator, in which the magnetic alternating fields occurring in the grooves of the carrier body are relatively high, making it disadvantageous to use an electrically highly conductive contact conductor because of the major eddy currents that would then arise in it.

In accordance with another feature of the invention, the laminated mica sheets are retained on or in an impregnatable substrate. Advantageously, the options include a laminated mica foil or tape with laminated mica sheets on impregnatable paper or an impregnatable textile, and possibly also a product of laminated mica that is enclosed between two such substrates.

In accordance with a further feature of the invention, the substrate is an electrically weakly conductive textile, which is especially advantageous in each such case. Such textiles are available in many forms. They may be formed of fibers that are formed of electrically weakly conductive plastics, are conductive from the admixture of electrically conductive pigments (such as soot), or have electrically weakly conductive coatings.

The term "electrically weakly conductive" should be understood as follows according to the invention: a generally flatly extended, thin object that carries electrical current (a foil or part of a textile) can be characterized in terms of its electrical resistance which it presents to electrical current flowing through the object in the surface, by a so-called "specific surface resistance". This specific surface resistance is equivalent to the quotient of the specific resistance of the substance from which the object is made and its thickness and therefore is equal to the electrical resistance of a square through which electric current flows perpendicular or parallel to its sides. The electrical resistance of a flat piece which is shaped in some other way is equivalent to the specific surface resistance multiplied by some factor. The factor depends only on the shape of the object and in particular is not dependent on the length of the object. Textiles and the like can be considered to be "weakly conductive" in the sense of the invention whenever their specific surface resistances have values that are approximately equivalent to the specific surface resistances of typical corona protection configurations, which are known per se, in dynamoelectric machines. Conductive textiles having specific surface resistances which are between 2 kΩ and 100 kΩ and preferably between 5 kΩ and 30 kΩ are particularly suitable. These figures for characterizing the "weak conductivity" refer to textiles once resin impregnation has been done. Typically, resin impregnation considerably increases the specific surface resistance of a textile, because the resin forms insulations between fibers that were in contact with one another before the impregnation. It has been found in practice that resin impregnation can increase the specific surface resistance of a conductive or weakly conductive textile by 10 times.

In accordance with an added feature of the invention, within the context of any embodiment of the configuration of the invention, the bridges for connecting the protective layer and the groove wall are formed of an electrically weakly conductive textile.

In accordance with an additional feature of the invention, pieces of an electrically weakly conductive tape are threaded through the separating layer so that they enter into electrical contact both with the protective layer of a winding element and with the groove wall.

In accordance with yet another feature of the invention, a single electrically weakly conductive textile tape is threaded along the winding element through a number of slits in the separating layer, in such a way that in segments it is located alternatingly on both sides of the separating layer. The bridges of the invention are accordingly the segments of the tape that pass through the separating layer.

In accordance with yet a further feature of the invention, there is provided an intermediate layer, being formed of an electrically weakly conductive textile, which is inserted between the separating layer and the groove wall. Such an intermediate layer may be a complete lining of the groove, or in other words a covering of both walls and the bottom of the groove. Under some circumstances, however, it is sufficient if only one groove wall is covered with the intermediate layer. Such an intermediate layer can contribute to fixing the winding elements in the grooves, because its very insertion gives the separating layer a certain unevenness, and thus the creation of large-area gaps that might possibly cross the entire groove is avoided, despite the development of fissures in the separating layer. In this way, despite fissuring, a certain positional fixation of the winding elements in the separating layer is achieved, which is advantageous.

If an intermediate layer is provided in the configuration of the invention, regardless of any other feature, this layer may serve as a substrate for the laminated mica sheets of the separating layer. This keeps down the number of components required to make up the configuration and reduces the production effort and expense.

In accordance with yet an added feature of the invention, each winding element is enveloped with its own separating layer. In this way, the separating layer can be formed as the winding conductor is being prepared, before being placed in the groove. This makes a substantial contribution toward simplifying the placement, because all of the components to be placed in the groove can be mounted on the winding elements easily, and without hindrance from tightness of space, before placement in the grooves.

In accordance with yet an additional feature of the invention, the separating layer of each winding element is a tape that contains the laminated mica and is wound in a number of windings around the winding element.

In accordance with again another feature of the invention, the electrically weakly conductive bridges are formed by a tape of an electrically weakly conducting textile that is secured along the winding element, by winding the tape forming the separating layer onto the winding element alternatingly over and under the tape forming the separating layer.

In accordance with a concomitant feature of the invention, the intermediate layer is also applied to a winding element enveloped by a separating layer, with this intermediate layer being in the form of an electrically weakly conductive textile. For instance, the winding element may be wrapped with an electrically weakly conductive tape over the separating layer.

With the objects of the invention in view, there is also provided a configuration which, in the context of any embodiment, is part of a heavy-duty dynamoelectric machine, particularly a stator, once it has been impregnated with a filler, in particular an epoxy resin or a mixture of epoxy resin and acid anhydride.

The configuration of any embodiment according to the invention, impregnated with an epoxy resin, a mixture of epoxy resin and acid anhydride, or some other preparation based on epoxy resin, is distinguished by the fact that each groove has at least one electrically shielded separating layer, located essentially parallel to a groove wall, with the strength of the layer being less than that of other layers in the groove, and thus the fissures caused by thermally dictated shrinkage processes occur preferentially, but without disadvantageous consequences, in this separating layer.

Other features which are considered as characteristic for the invention are set forth in the appended claims.

Although the invention is illustrated and described herein as embodied in an impregnatable configuration of a bearer or carrier body and winding elements, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
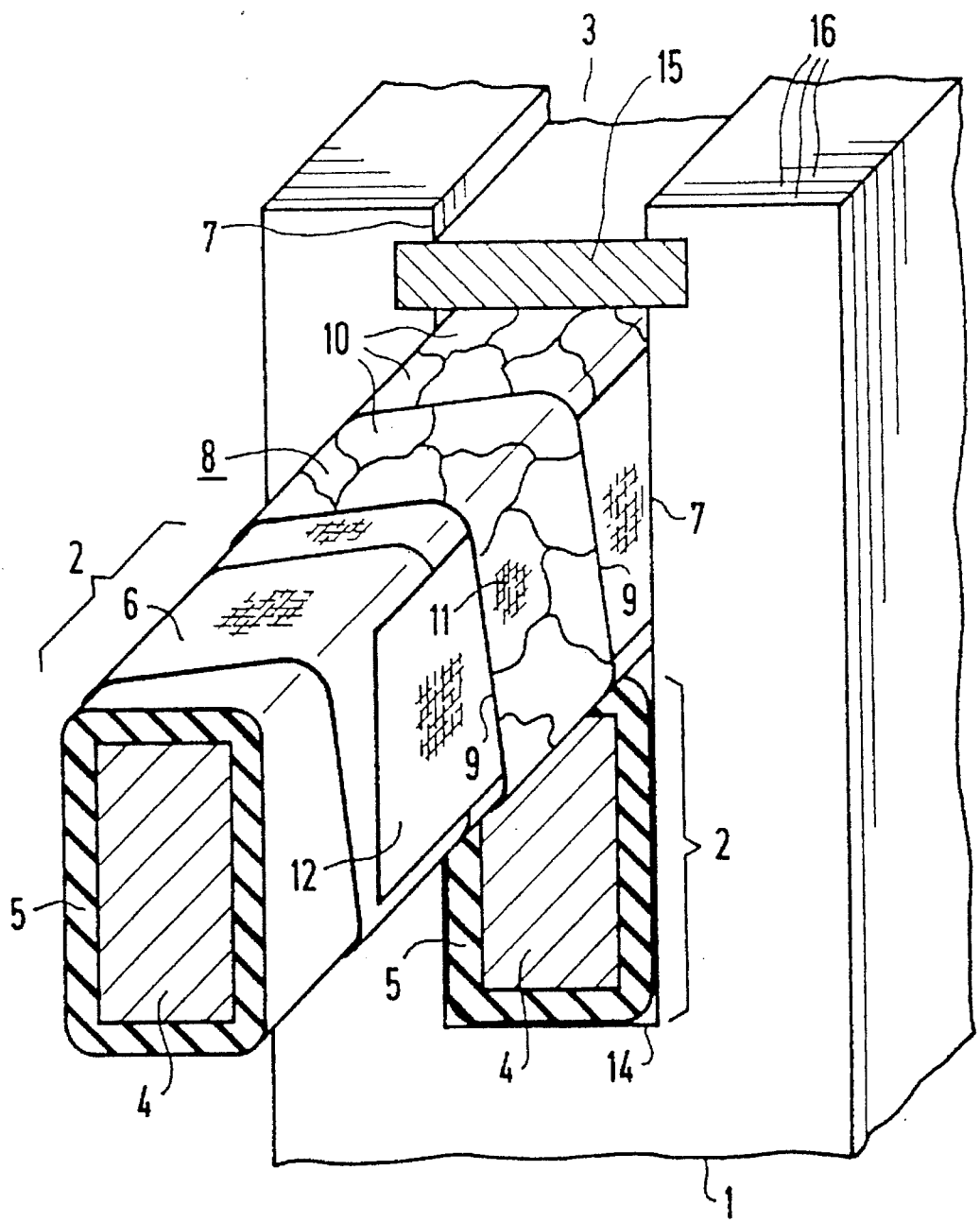
FIG. 1 is a fragmentary, diagrammatic, perspective view of a simple exemplary embodiment of the invention.

Referring now in detail to the figures of the drawing, in which exemplary embodiments are sometimes shown slightly diagrammatically and/or distorted in order to stress characteristics which are essential to the invention, and first, particularly, to FIG. 1 thereof, there is seen a portion of a configuration of a ferromagnetic and electrically conductive bearer or carrier body 1 being formed of stacked metal plates 16, with two winding elements 2 that are placed in a groove 3 of the bearer or carrier body 1. The groove 3 is closed with a groove closure 15. Each winding element 2 has an electrically highly conductive basic unit 4, which is surrounded by an insulating sleeve 5 that has a protective layer 6 in the form of a tape wound onto the insulating sleeve 5. The basic unit 4 shown in each winding element 2 is non-structured. It should be noted that in heavy-duty dynamoelectric machines, typically each winding element of a basic unit includes a number of metal rods or wires, at least some of which are possibly hollow in order to carry a flowable coolant such as air, hydrogen or water. A separating layer 8 is wound over the protective layer 6 of each winding element 2. This separating layer 8 is formed with a tape that contains laminated mica sheets 10 on a substrate 11 of paper or fibers. One laminated mica sheet 10 of the separating layer 8 has been left out in order to show the substrate 11. In order to form electrically weakly conductive bridges 9 between the protective layer 6 and a groove wall 7, an electrically weakly conductive tape 12 is wound together with the separating layer 8 onto the winding element 2 in such a way that the tape 12 is located alternatingly over and under the separating layer 8. In this way, the tape 12 comes into the contact with both the protective layer 6 and the groove wall 7. Segments of the tape 12 that pass through the separating layer 8 form the bridges 9. Since in the case shown each winding element 2 is completely surrounded by a separating layer 8, the layers according to the invention that have reduced mechanical strength are located not only between a single groove wall 7 and each winding element 2 but also between each winding element 2 and each groove wall 7 as well as between the lower winding element 2 and the groove bottom 14.

Figure 2:
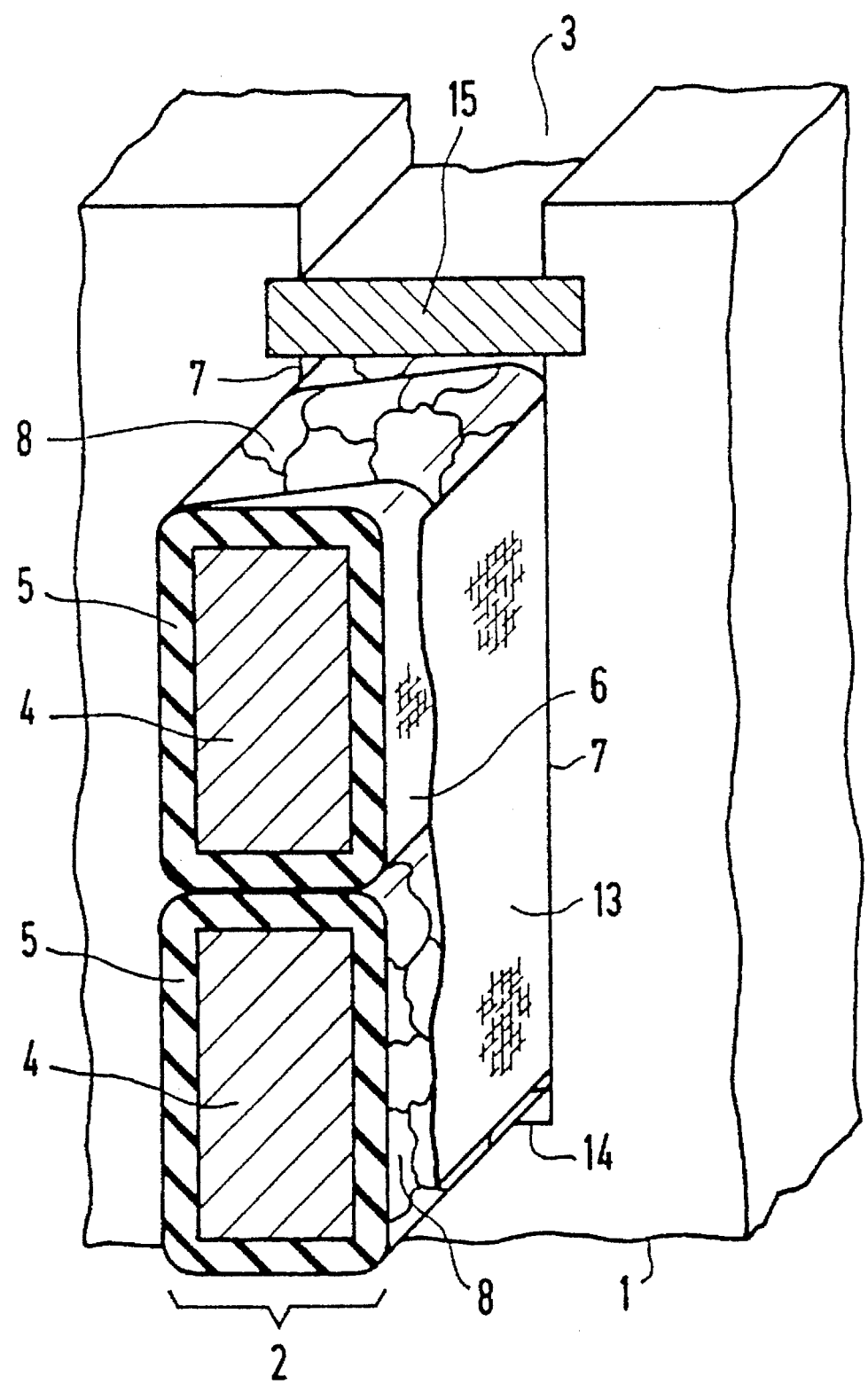
FIG. 2 is a view similar to FIG. 1 of an exemplary embodiment of the invention which is constructed in accordance with a further feature.

FIG. 2 shows a further exemplary embodiment of the configuration according to the invention including a carrier body 1 and winding elements 2 that are placed in a groove 3 of the carrier body 1. The groove 3 is closed with a groove closure 15. Each winding element 2 has a basic unit 4, an insulating sleeve 5 and a protective layer 6 and is surrounded by a separating layer 8. An intermediate layer 13 of an electrically conductive, preferably weakly conductive textile is inserted between a groove wall 7 and the winding elements 2. This intermediate layer 13 further improves the properties of the separating layer 8 in the manner already discussed. An intermediate layer 13 that covers only one groove wall 7 is shown. However, it is quite possible and is even advantageous under some circumstances to use a U-shaped intermediate layer that covers both groove walls 7 and the groove bottom 14 as well.

Figure 3:
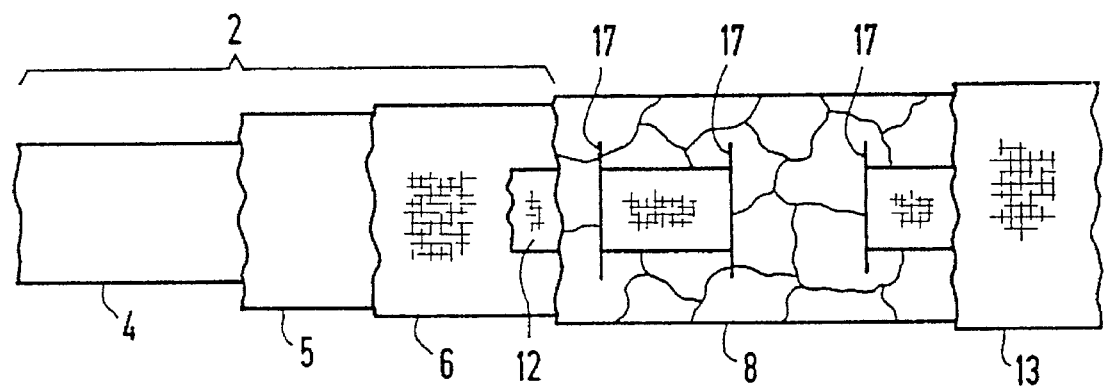
FIGS. 3 and 4 are respective plan and cross-sectional views of a winding element which is usable in the context of an especially advantageous embodiment of the invention.
Figure 4:
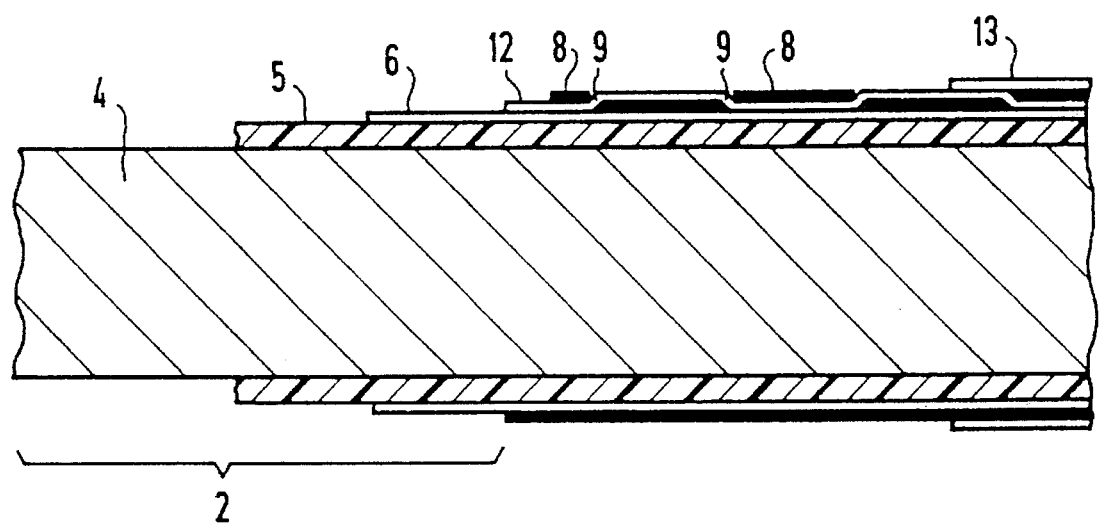

An especially preferred embodiment of the configuration of the invention can be attained by using a winding element 2 with additions, as is shown in a plan view in FIG. 3 and in a cross section at right angles to the plane of FIG. 3 in FIG. 4. The winding element 2 (in this example a winding rod) with a basic unit 4, an insulating sleeve 5 and a protective layer 6 is enveloped by the separating layer 8, which in turn is surrounded by the intermediate layer 13. In order to electrically connect the protective layer 6 to the intermediate layer 13, an electrically weakly conductive tape 12 is passed through slits 17 in the separating layer 8, alternatingly over and under the separating layer 8, so that it is in contact with both the intermediate layer 13 and the protective layer 6. Bridges 9 are formed by segments of the tape 12 that pass through the slits 17. According to the invention, all that is needed is to place the configuration shown in FIGS. 3 and 4 into the carrier body. All of the components to be installed in the carrier body are already combined with the winding element 2. It will be understood that advantageously the insulating sleeve 5, the protective layer 6, the separating layer 8 and the intermediate layer 13 are produced by successive wrapping of the basic unit 4 with tapes, which are optionally weakly conductive and/or contain mica. Such options may already be found in FIGS. 1 and 2 and naturally can be adopted in the configurations of FIGS. 3 and 4 as well.

Figure 5:
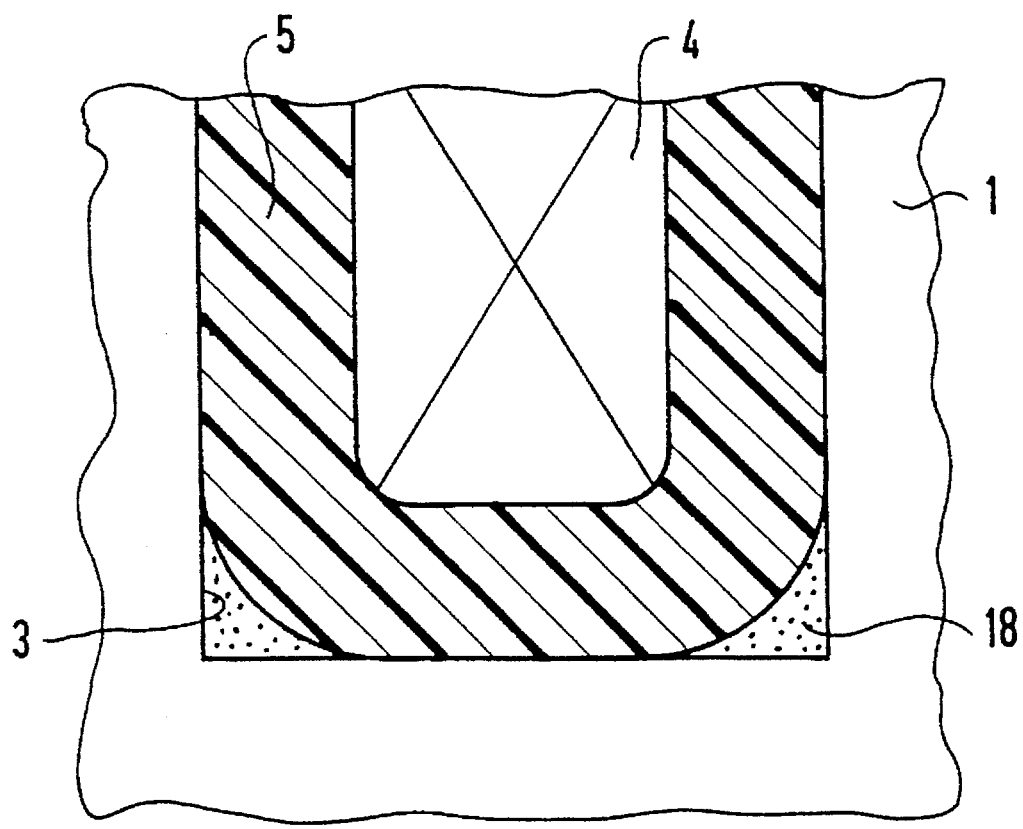
FIG. 5 is an enlarged, fragmentary, longitudinal-sectional view of the vicinity of a groove bottom of FIG. 1.

FIG. 5 shows a portion of the configuration shown in FIG. 1, after an impregnation with a filler, such as an epoxy resin, has been carried out. A winding element 2 located in the groove 3 of the carrier body 1, along with the basic unit 4 and the thus impregnated insulating sleeve 5 can be seen. The groove 3 is completely filled with a filler 18 between the carrier body 1 and the insulating sleeve 5, so that the configuration is largely monolithic aside, of course, from any possible gaps in the separating layer 8 (which are not visible in FIG. 5) that may have occurred or will occur.

The configuration according to the invention of a ferromagnetic, electrically conductive carrier body and winding elements of any construction is especially suitably adapted to the requirements of the whole-part impregnation process for producing a component for a heavy-duty electric machine, in particular a stator, both with a view toward the required manufacturing costs and effort and with a view toward loads that occur during operation.

We claim:

1. A configuration, comprising:
   a) a ferromagnetic and electrically conductive carrier body having grooves formed therein defining groove walls;
   b) winding elements disposed in said grooves, each of said winding elements having an electrically highly conductive basic unit, an impregnatable insulating sleeve surrounding said basic unit, and an electrically weakly conductive, impregnatable protective layer enveloping said insulating sleeve;
   c) impregnatable separating layers each being disposed between a respective one of said winding elements and at least one of said groove walls of a respective one of said grooves, said separating layers being substantially formed of laminated mica sheets resting flat between said winding elements and said groove wall; and
   d) a multiplicity of electrically weakly conductive bridges electrically connecting said protective layer through said separating layer to said groove wall.

2. The configuration according to claim 1, including an impregnatable substrate on or in which said laminated mica sheets are retained.

3. The configuration according to claim 2, wherein said substrate is formed of an electrically weakly conductive textile.

4. The configuration according to claim 1, wherein said bridges are formed of an electrically weakly conductive textile.

5. The configuration according to claim 4, wherein said bridges include at least one tape of an electrically weakly conductive textile, said tape being passed multiple times through said separating layer and being electrically connected to both said protective layer and said groove wall.

6. The configuration according to claim 1, including an intermediate layer of an electrically weakly conductive textile being disposed between said separating layer and said groove wall.

7. The configuration according to claim 6, wherein said intermediate layer covers said groove wall.

8. The configuration according to claim 6, wherein said separating layer is secured on said intermediate layer.

9. The configuration according to claim 1, wherein each of said winding elements is enveloped by a respective one of said separating layers.

10. The configuration according to claim 9, wherein each of said separating layers is a tape wound multiple times around a respective one of said winding elements.

11. The configuration according to claim 10, including a tape of an electrically weakly conductive textile being applied onto said winding element with and alternatingly over and under said separating layer, for forming said bridges.

12. The configuration according to claim 9, including an intermediate layer being formed of an electrically weakly conductive textile and enveloping said separating layer, on each of said winding elements.

13. The configuration according to claim 12, wherein said intermediate layer is a tape of an electrically weakly conductive textile being wound onto said separating layer.

14. The configuration according to claim 1, including an impregnating filler, each of said grooves having at least one of said separating layers being disposed substantially parallel to one of said groove walls and having a strength being less than that of other layers in said groove.

15. The configuration according to claim 14, wherein said filler is a cured epoxy resin.

16. The configuration according to claim 1, wherein said winding elements are winding rods.

17. In a heavy-duty dynamoelectric machine, which is impregnated with a filler, a configuration, comprising:

a) a ferromagnetic and electrically conductive carrier body having grooves formed therein defining groove walls;

b) winding elements disposed in said grooves, each of said winding elements having an electrically highly conductive basic unit, an impregnatable insulating sleeve surrounding said basic unit, and an electrically weakly conductive, impregnatable protective layer enveloping said insulating sleeve;

c) impregnatable separating layers each being disposed between a respective one of said winding elements and at least one of said groove walls of a respective one of said grooves, said separating layers being substantially formed of laminated mica sheets resting flat between said winding rod and said groove wall; and d) a multiplicity of electrically weakly conductive bridges electrically connecting said protective layer through said separating layer to said groove wall.

18. The configuration according to claim 17, wherein the filler is a cured epoxy resin.

19. The configuration according to claim 17, wherein said winding elements are winding rods.

* * * * *